(12) United States Patent
Rowe et al.

(10) Patent No.: US 9,658,726 B2
(45) Date of Patent: May 23, 2017

(54) SINGLE LAYER SENSOR PATTERN

(71) Applicant: Cypress Semiconductor Corporation, San Jose, CA (US)

(72) Inventors: Gabriel Rowe, Kirkland, WA (US); Chuanwei Wang, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/740,170

(22) Filed: Jun. 15, 2015

(65) Prior Publication Data

US 2016/0011690 A1 Jan. 14, 2016

Related U.S. Application Data

(60) Provisional application No. 62/023,126, filed on Jul. 10, 2014, provisional application No. 62/043,916, (Continued)

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01)

(58) Field of Classification Search
CPC .......... G06F 3/041; G06F 3/042; G06F 3/044; G06F 3/045; G06F 3/048
See application file for complete search history.

(56) References Cited

U.S. PATENT DOCUMENTS 4,233,522 A 11/1980 Grummer et al.
4,686,332 A 8/1987 Greanias et al.
(Continued)

FOREIGN PATENT DOCUMENTS

CN 1928800 A 3/2007
CN 101470557 A 7/2009
(Continued)

OTHER PUBLICATIONS

O'Connor, Todd. "mTouch™ Projected Capacitive Touch Screen Sensing Theory of Operation." TB3064 Microchip Technology Inc 16 (2010).
(Continued)

*Primary Examiner* — Ilana Spar
*Assistant Examiner* — Nguyen H Truong

(57) ABSTRACT

A capacitive sensor array comprises large sensor electrodes and small sensor electrodes formed from a single layer of conductive material. Each sensor electrode of a first set of small sensor electrodes is electrically connected to a first pad. A first axis crosses two or more of the sensor electrodes of the first set of small sensor electrodes, and each small sensor electrode of the first set of small sensor electrodes is located on an opposite lateral side of one of the large sensor electrodes from another small sensor electrode of the first set. Each sensor electrode of a second set of small sensor electrodes is electrically connected to a second pad. A second axis crosses two or more of the sensor electrodes of the second set of small sensor electrodes, and each small sensor electrode of the second set is located on an opposite lateral side of one of the large sensor electrodes from another small sensor electrode of the second set.

18 Claims, 8 Drawing Sheets

Related U.S. Application Data filed on Aug. 29, 2014, provisional application No. 62/083,771, filed on Nov. 24, 2014.

(56) References Cited

U.S. PATENT DOCUMENTS

| | | | |
|---|---|---|---|
| 4,707,845 A | 11/1987 | Krein et al. | |
| 5,834,845 A | 11/1998 | Stolmeijer | |
| 7,129,935 B2 | 10/2006 | Mackey | |
| 7,202,855 B2 | 4/2007 | Shigetaka et al. | |
| 7,202,859 B1 | 4/2007 | Speck et al. | |
| 7,265,809 B2 | 9/2007 | Dunn et al. | |
| 7,280,173 B2 | 10/2007 | Kamijo | |
| 7,375,978 B2 | 5/2008 | Conner et al. | |
| 7,382,139 B2 | 6/2008 | Mackey | |
| 7,423,635 B2 | 9/2008 | Taylor et al. | |
| 7,439,962 B2 | 10/2008 | Reynolds et al. | |
| 7,499,039 B2 | 3/2009 | Roberts | |
| 7,548,073 B2 | 6/2009 | Mackey et al. | |
| 7,821,425 B2 | 10/2010 | Philipp | |
| 7,875,814 B2 | 1/2011 | Chen et al. | |
| 7,973,771 B2 | 7/2011 | Geaghan | |
| 8,243,027 B2 | 8/2012 | Hotelling et al. | |
| 8,274,486 B2 | 9/2012 | Barbier et al. | |
| 8,274,488 B2 | 9/2012 | Bae | |
| 8,294,687 B1 | 10/2012 | Ksondzyk | |
| 8,300,019 B2 | 10/2012 | Elias et al. | |
| 8,497,786 B2 | 7/2013 | Camacho et al. | |
| 8,508,680 B2 | 8/2013 | Geaghan et al. | |
| 8,564,558 B2 | 10/2013 | Yi et al. | |
| 8,599,150 B2 | 12/2013 | Philipp | |
| 8,610,688 B2 | 12/2013 | Hristov et al. | |
| 8,754,662 B1 | 6/2014 | Weng et al. | |
| 8,866,490 B1 | 10/2014 | Mandziy et al. | |
| 8,866,491 B2 | 10/2014 | Ksondzyk et al. | |
| 9,256,327 B2 | 2/2016 | Salaverry et al. | |
| 2003/0210235 A1 | 11/2003 | Roberts | |
| 2004/0175257 A1 | 9/2004 | Pallas | |
| 2004/0239650 A1 | 12/2004 | MacKey | |
| 2005/0270039 A1 | 12/2005 | MacKey | |
| 2005/0270273 A1 | 12/2005 | Marten | |
| 2006/0097991 A1 | 5/2006 | Hotelling et al. | |
| 2006/0227115 A1 | 10/2006 | Fry | |
| 2007/0008299 A1 | 1/2007 | Hristov | |
| 2007/0074913 A1 | 4/2007 | Geaghan et al. | |
| 2007/0074914 A1 | 4/2007 | Geaghan et al. | |
| 2007/0132386 A1 | 6/2007 | Kim et al. | |
| 2007/0257894 A1 | 11/2007 | Philipp | |
| 2007/0279395 A1 | 12/2007 | Philipp et al. | |
| 2008/0074398 A1 | 3/2008 | Wright | |
| 2008/0143683 A1 | 6/2008 | Hotelling | |
| 2008/0158181 A1 | 7/2008 | Hamblin et al. | |
| 2008/0246496 A1 | 10/2008 | Hristov et al. | |
| 2008/0264699 A1 | 10/2008 | Chang et al. | |
| 2009/0002337 A1 | 1/2009 | Chang | |
| 2009/0090694 A1 | 4/2009 | Hotelling et al. | |
| 2009/0091551 A1 | 4/2009 | Hotelling et al. | |
| 2009/0109190 A1 | 4/2009 | Elias | |
| 2009/0159344 A1 | 6/2009 | Hotelling et al. | |
| 2009/0273577 A1 | 11/2009 | Chen et al. | |
| 2009/0314621 A1 | 12/2009 | Hotelling | |
| 2010/0013800 A1* | 1/2010 | Elias et al. ............... 345/178 | |
| 2010/0045614 A1 | 2/2010 | Gray et al. | |
| 2010/0053116 A1 | 3/2010 | Daverman et al. | |
| 2010/0059294 A1 | 3/2010 | Elias et al. | |
| 2010/0079401 A1 | 4/2010 | Staton | |
| 2010/0090979 A1 | 4/2010 | Bae | |
| 2010/0108409 A1 | 5/2010 | Tanaka et al. | |
| 2010/0144391 A1 | 6/2010 | Chang et al. | |
| 2010/0156811 A1 | 6/2010 | Long et al. | |
| 2010/0194698 A1* | 8/2010 | Hotelling et al. ......... 345/173 | |
| 2010/0214247 A1* | 8/2010 | Tang ................ G06F 3/044 345/173 | |
| 2010/0214260 A1 | 8/2010 | Tanaka et al. | |
| 2010/0220071 A1 | 9/2010 | Nishihara et al. | |
| 2010/0258360 A1 | 10/2010 | Yilmaz | |
| 2010/0289774 A1 | 11/2010 | Pan et al. | |
| 2010/0321326 A1* | 12/2010 | Grunthaner ........... G06F 3/044 345/174 | |
| 2010/0321331 A1 | 12/2010 | Oda et al. | |
| 2011/0012845 A1 | 1/2011 | Rothkopf et al. | |
| 2011/0018841 A1 | 1/2011 | Hristov | |
| 2011/0048812 A1 | 3/2011 | Yilmaz | |
| 2011/0048813 A1 | 3/2011 | Yilmaz | |
| 2011/0102361 A1 | 5/2011 | Philipp | |
| 2011/0134070 A1 | 6/2011 | Wang et al. | |
| 2011/0134075 A1 | 6/2011 | Takusa | |
| 2011/0148785 A1 | 6/2011 | Oda et al. | |
| 2011/0170099 A1 | 7/2011 | Ko | |
| 2011/0279169 A1 | 11/2011 | Salaverry | |
| 2012/0050180 A1 | 3/2012 | King et al. | |
| 2012/0081324 A1 | 4/2012 | Philipp | |
| 2012/0098783 A1 | 4/2012 | Badaye et al. | |
| 2012/0105356 A1 | 5/2012 | Brosnan et al. | |
| 2012/0162090 A1 | 6/2012 | Chang et al. | |
| 2012/0162144 A1 | 6/2012 | Faahraeus et al. | |
| 2012/0182251 A1 | 7/2012 | Krah | |
| 2012/0200530 A1 | 8/2012 | Wu et al. | |
| 2012/0227259 A1 | 9/2012 | Badaye et al. | |
| 2012/0255167 A1 | 10/2012 | Badaye et al. | |
| 2012/0256642 A1 | 10/2012 | Badaye et al. | |
| 2012/0256851 A1 | 10/2012 | Wang et al. | |
| 2012/0262412 A1 | 10/2012 | Guard et al. | |
| 2013/0021296 A1 | 1/2013 | Min et al. | |
| 2013/0050105 A1 | 2/2013 | Lee et al. | |
| 2013/0063396 A1 | 3/2013 | Kim et al. | |
| 2013/0069905 A1 | 3/2013 | Krah et al. | |
| 2013/0100041 A1* | 4/2013 | Golovchenko et al. ...... 345/173 | |
| 2013/0100054 A1 | 4/2013 | Philipp | |
| 2013/0127769 A1 | 5/2013 | Guard et al. | |
| 2013/0127772 A1 | 5/2013 | Guard et al. | |
| 2013/0127775 A1 | 5/2013 | Yilmaz et al. | |
| 2013/0154996 A1 | 6/2013 | Trend et al. | |
| 2013/0181943 A1 | 7/2013 | Bulea et al. | |
| 2013/0187704 A1 | 7/2013 | Edwards | |
| 2013/0207911 A1 | 8/2013 | Barton et al. | |
| 2013/0234974 A1 | 9/2013 | Guard | |
| 2013/0329347 A1 | 12/2013 | Kuo et al. | |
| 2014/0014489 A1* | 1/2014 | Chen .................. G06F 3/045 200/5 A | |
| 2014/0092036 A1 | 4/2014 | Lin et al. | |
| 2014/0125883 A1* | 5/2014 | Chang ................ G06F 3/044 349/12 | |
| 2014/0192027 A1 | 7/2014 | Ksondzyk et al. | |
| 2014/0210784 A1* | 7/2014 | Gourevitch et al. ......... 345/174 | |
| 2014/0308435 A1 | 10/2014 | Burberry et al. | |
| 2014/0333847 A1* | 11/2014 | Yu ..................... G06F 3/044 349/12 | |
| 2015/0116254 A1* | 4/2015 | Solven ................. G06F 3/044 345/174 | |

FOREIGN PATENT DOCUMENTS

| | | |
|---|---|---|
| CN | 101578574 B | 7/2012 |
| DE | 202012101378 U1 | 4/2012 |
| JP | 2010205177 A | 9/2010 |
| KR | 20090020048 A | 9/2009 |
| WO | 2010016174 A1 | 2/2010 |
| WO | 2010117882 A | 10/2010 |
| WO | 2011122782 A2 | 10/2011 |
| WO | 2012176639 A | 12/2012 |
| WO | 2013179042 A | 12/2013 |

OTHER PUBLICATIONS

Touch Technology Brief: Projected Capacitive Technology, 2013, 3M Touch Systems, Methuen, MA.
International Search Report for International Application No. PCT/US2015/039699 dated Oct. 5, 2015; 2 pages.
Written Opinion of the International Searching Authority for International Application No. PCT/US2015/036699 mailed Oct. 5, 2015; 6 pages.

(56) References Cited

OTHER PUBLICATIONS

USPTO Non-Final Rejection for U.S. Appl. No. 14/666,764 dated Apr. 15, 2016; 14 pages.
USPTO Non-Final Rejection for U.S. Appl. No. 14/740,170 dated May 25, 2016; 20 pages.
USPTO Notice of Allowance for U.S. Appl. No. 13/528,644 dated Jan. 25, 2013; 5 pages.
USPTO Notice of Allowance for U.S. Appl. No. 13/528,644 dated Apr. 23, 2013; 6 pages.
USPTO Notice of Allowance for U.S. Appl. No. 13/528,644 dated Jun. 7, 2013; 6 pages.
USPTO Notice of Allowance for U.S. Appl. No. 13/800,468 dated Sep. 12, 2014; 8 pages.
USPTO Notice of Allowance for U.S. Appl. No. 13/918,252 dated Feb. 6, 2014; 8 pages.
USPTO Notice of Allowance for U.S. Appl. No. 13/918,252 dated Mar. 25, 2014; 8 pages.
USPTO Notice of Allowance for U.S. Appl. No. 14/038,423 dated Sep. 9, 2014; 9 pages.
USPTO Notice of Allowance for U.S. Appl. No. 14/229,524 dated Oct. 23, 2014; 16 pages.
USPTO Notice of Allowance for U.S. Appl. No. 14/318,354 dated Mar. 16, 2016; 10 pages.
USPTO Requirement for Restriction/Election for U.S. Appl. No. 14/229,524 dated Jun. 10, 2014; 6 pages.
USPTO Requirement to Restriction for U.S. Appl. No. 13/405,071 dated Sep. 13, 2013; 5 pages.
USPTO Requirement to Restriction for U.S. Appl. No. 13/528,644 dated Aug. 21, 2012; 6 pages.
Written Opinion of the International Searching Authority for International Application No. PCT/US11/53916 dated Apr. 10, 2012; 5 pages.
Written Opinion of the International Searching Authority for International Application No. PCT/US12/26634 mailed May 29, 2012; 5 pages.
Written Opinion of the International Searching Authority for International Application No. PCT/US13/62331 dated Feb. 12, 2014; 4 pages.
Written Opinion of the International Searching Authority for International Application No. PCT/US14/16781 mailed May 16, 2014; 6 pages.
Written Opinion of the International Searching Authority for International Application No. PCT/US14/51363 mailed Dec. 18, 2014; 7 pages.
Wu, Xiaoling et al., "Touchware: A Software-Based Technique for High-Resolution Multi-Touch Sensing Devices," Int. J. Ad Hoc and Ubiquitous Computing, vol. X, No. X, 200x; 13 pages.
Wu, Xiaoling, Touchware: A Software based Implementation for High Resolution Multi-touch Applications, IEEE 10th International Conference on Computer and Information Technology (CIT), Jun. 29, 2010-Jul. 1, 2010, pp. 1703-1710; 8 pages.
Appelt, B.K., "Single sided substrates and packages based on laminate materials," IEEE Advanced Packaging Materials: Microtech, 2010. APM '10. International Symposium, Cambridge, on, Feb. 28, 2010-Mar. 2, 2010; pp. 13-16.
U.S. Appl. No. 13/248,776: "Single Layer Touch Sensor," Massoud Badaye, filed Sep. 29, 2011; 36 pages.
U.S. Appl. No. 13/405,071: "Single Layer Touch Sensor," Massoud BADAYE, filed Feb. 24, 2012; 64 pages.
U.S. Appl. No. 13/528,739: "Single Layer Touch Sensor," Massoud Badaye, filed Jun. 20, 2012; 64 pages.
U.S. Appl. No. 13/800,468: "Method and Apparatus for Eliminating Tail Effect in Touch Applications," Vasyl Mandziy, filed Mar. 13, 2013; 51 pages.
U.S. Appl. No. 13/918,252: "Flipped Cell Sensor Pattern" Xiaoping Weng et al., filed Jun. 14, 2013; 68 pages.
U.S. Appl. No. 14/229,524: "Touch Sensor Device" Alexandre Gourevitch et al., filed Mar. 28, 2014; 72 pages.
U.S. Appl. No. 14/303,881: "Flipped Cell Sensor Pattern," Xiaoping Weng, filed Jun. 13, 2014; 68 pages.
U.S. Appl. No. 14/318,354: "SLIM Sensor Design with Minimum Tail Effect," Igor Kravets, filed Jun. 12, 2014; 67 pages.
U.S. Appl. No. 14/666,764: "Single Layer Touch Sensor," Patrick Prendergast, filed Mar. 24, 2015; 64 pages.
Application No. PCT/US11/53916: "Single Layer Touch Sensor," filed Sep. 29, 2011; 35 pages.
Fischer, Dirk, "Capacitive Touch Sensors: Application Fields, Technology Overview, and Implementation Example", Fujitsu Microelectronics Europe; Langen, Germany; v4, dated Jan. 12, 2010; 12 pages.
Hirt, E., "Early footprint comparison for area I/O packages and first level interconnect," 49th Electronic Components and Technology Conference, No. 6, 1999 Proceedings, Dec. 1989, pp. 1569-1575; 7 pages.
International Search Report for International Application No. PCT/US11/53916 dated Apr. 10, 2012; 3 pages.
International Search Report for International Application No. PCT/US12/26634 dated May 29, 2012; 2 pages.
International Search Report for International Application No. PCT/US13/62331 dated Jan. 12, 2014; 2 pages.
International Search Report for International Application No. PCT/US14/16781 dated May 16, 2014; 2 pages.
International Search Report for International Application No. PCT/US14/51363 dated Dec. 18, 2014; 2 pages.
SIPO Office Action for Chinese Application No. 201280001803.8 dated Jan. 6, 2015; 6 pages.
USPTO Advisory Action for U.S. Appl. No. 13/405,071 dated Jan. 9, 2015; 3 pages.
USPTO Advisory Action for U.S. Appl. No. 14/229,524 dated Dec. 31, 2014; 3 pages.
USPTO Advisory Action for U.S. Appl. No. 14/318,354 dated Mar. 13, 2015; 3 pages.
USPTO Final Rejection for U.S. Appl. No. 13/405,071 dated Aug. 17, 2016; 19 pages.
USPTO Final Rejection for U.S. Appl. No. 13/405,071 dated Oct. 16, 2014; 18 pages.
USPTO Final Rejection for U.S. Appl. No. 13/528,739 dated Dec. 15, 2015; 19 pages.
USPTO Final Rejection for U.S. Appl. No. 13/800,468 dated May 22, 2014; 10 pages.
USPTO Final Rejection for U.S. Appl. No. 13/918,252 dated Dec. 10, 2013; 16 pages.
USPTO Final Rejection for U.S. Appl. No. 14/038,423 dated May 22, 2014; 11 pages.
USPTO Final Rejection for U.S. Appl. No. 14/229,524 dated Jan. 14, 2016; 16 pages.
USPTO Final Rejection for U.S. Appl. No. 14/229,524 dated Oct. 23, 2014; 16 pages.
USPTO Final Rejection for U.S. Appl. No. 14/318,354 dated Dec. 26, 2014; 19 pages.
USPTO Final Rejection for U.S. Appl. No. 14/318,354 dated Dec. 15, 2015; 21 pages.
USPTO Final Rejection for U.S. Appl. No. 14/666,764 dated Aug. 16, 2016; 18 pages.
USPTO Final Rejection for U.S. Appl. No. 13/405,071 dated Jul. 22, 2015; 21 pages.
USPTO Non-Final Rejection for U.S. Appl. No. 13/405,071 dated Apr. 7, 2016; 14 pages.
USPTO Non-Final Rejection for U.S. Appl. No. 13/405,071 dated Apr. 30, 2015; 19 pages.
USPTO Non-Final Rejection for U.S. Appl. No. 13/405,071 dated Jul. 21, 2014; 15 pages.
USPTO Non-Final Rejection for U.S. Appl. No. 13/528,644 dated Nov. 20, 2012; 6 pages.
USPTO Non-Final Rejection for U.S. Appl. No. 13/528,739 dated Apr. 29, 2015; 19 pages.
USPTO Non-Final Rejection for U.S. Appl. No. 13/800,468 dated Jan. 21, 2014; 8 pages.
USPTO Non-Final Rejection for U.S. Appl. No. 13/918,252 dated Sep. 20, 2013; 12 pages.
USPTO Non-Final Rejection for U.S. Appl. No. 14/038,423 dated Jan. 14, 2014; 9 pages.

(56) References Cited

OTHER PUBLICATIONS

USPTO Non-Final Rejection for U.S. Appl. No. 14/229,524 dated Jul. 29, 2014; 15 pages.
USPTO Non-Final Rejection for U.S. Appl. No. 14/229,524 dated May 28, 2015; 16 pages.
USPTO Non-Final Rejection for U.S. Appl. No. 14/318,354 dated Jun. 10, 2015; 19 pages.
USPTO Non-Final Rejection for U.S. Appl. No. 14/318,354 dated Sep. 9, 2014; 18 pages.

* cited by examiner

SINGLE LAYER SENSOR PATTERN

RELATED APPLICATIONS

This application claims priority to U.S. Provisional Application No. 62/023,126, filed on Jul. 10, 2014, to U.S. Provisional Application No. 62/043,916, filed on Aug. 29, 2014, and to U.S. Provisional Application No. 62/083,771, filed on Nov. 24, 2014, all of which are incorporated by reference herein in their entirety.

TECHNICAL FIELD

This disclosure relates to the field of touch-sensors and, in particular, to capacitive touch-sensor arrays.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor electrodes that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

In one embodiment, a capacitance sensor coupled with a capacitive sensor array can be used to scan the capacitive sensor array by measuring self capacitances associated with each sensor electrode, or mutual capacitances between pairs of sensor electrodes. The capacitance sensor may then transmit the measured capacitance values to a host, where the capacitance values may be further processed to determine, for example, locations of fingers or other conductive objects near or touching the surface of the capacitive sensor array. In one embodiment, the host compensates for capacitance differences between the regions having different patterns of conductive traces.

Figure 1:
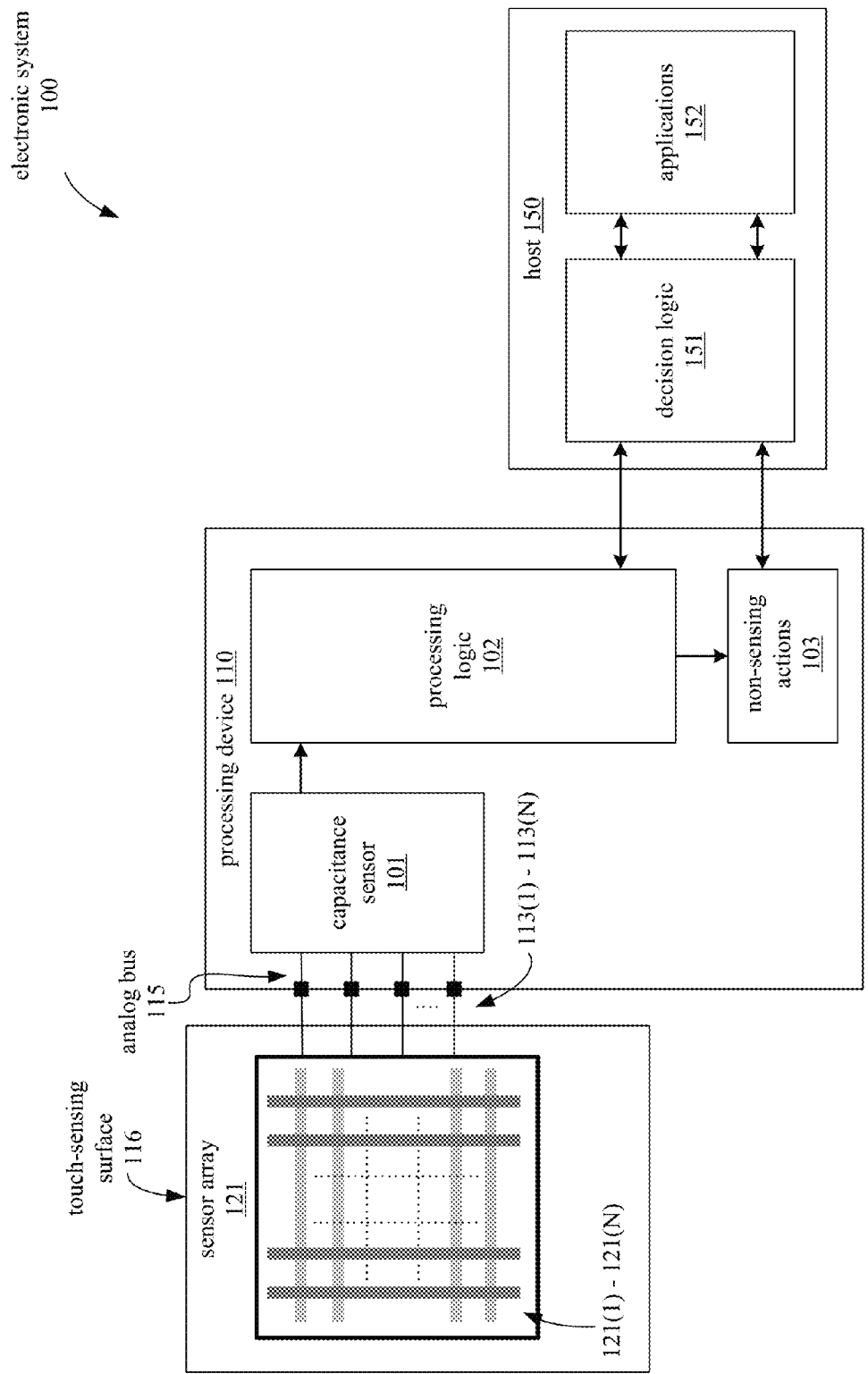
FIG. 1 is a block diagram illustrating an embodiment of an electronic system that processes touch sensor data.

FIG. 1 illustrates a block diagram of one embodiment of an electronic system 100 including a processing device 110 that may be configured to measure capacitances from a touch sensing surface 116 including a capacitive sensor array. The electronic system 100 includes a touch-sensing surface 116 (e.g., a touchscreen, or a touch pad) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor electrodes 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor electrode 121(1)-121(N) is represented as a capacitor.

In one embodiment, the capacitance sensor 101 may include a relaxation oscillator or other means to convert a capacitance into a measured value. The capacitance sensor 101 may also include a counter or timer to measure the oscillator output. The processing device 110 may further include software components to convert the count value (e.g., capacitance value) into a sensor electrode detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
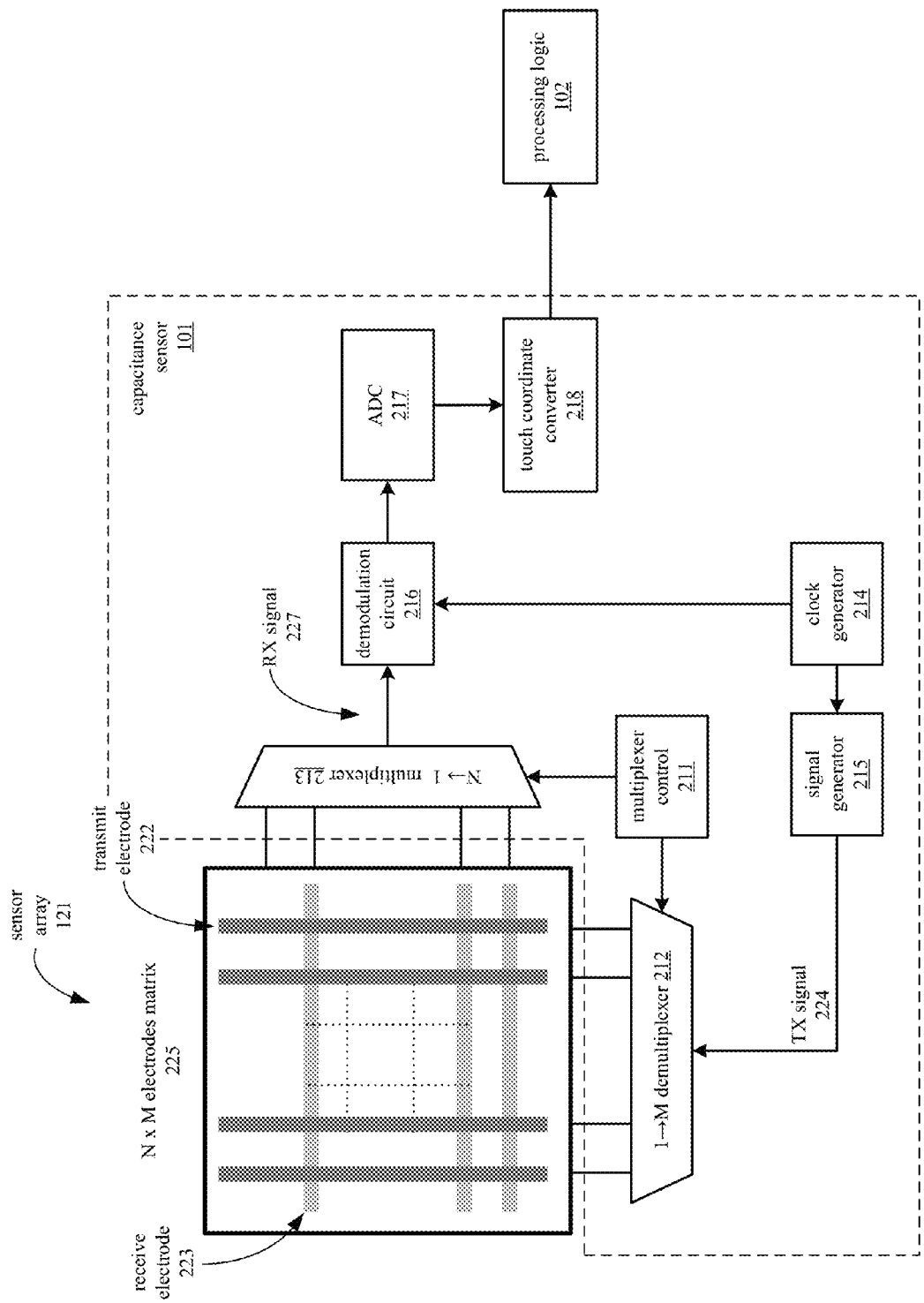
FIG. 2 is a block diagram illustrating an embodiment of an electronic system that processes touch sensor data.

FIG. 2 is a block diagram illustrating one embodiment of a capacitive touch sensor array 121 and a capacitance sensor 101 that converts changes in measured capacitances to coordinates indicating the presence and location of touch. The coordinates are calculated based on changes in measured capacitances relative to the capacitances of the same touch sensor array 121 in an un-touched state. In one embodiment, sensor array 121 and capacitance sensor 101 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 may be implemented in the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied. In an alternate embodiment the TX signal 224 may be presented in a true form to a subset of the transmit electrodes 222 and in complement form to a second subset of the transmit electrodes 222, wherein there is no overlap in members of the first and second subset of transmit electrodes 222.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a change in the measured mutual capacitance between only some of the electrodes. For example, if a finger is placed near the intersection of transmit electrode 222 and receive electrode 223, the presence of the finger will decrease the charge coupled between electrodes 222 and 223. Thus, the location of the finger on the touchpad can be determined by identifying the one or more receive electrodes having a decrease in measured mutual capacitance in addition to identifying the transmit electrode to which the TX signal 224 was applied at the time the decrease in capacitance was measured on the one or more receive electrodes.

By determining the mutual capacitances associated with each intersection of electrodes in the matrix 225, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected.

The induced current signal 227 is integrated by demodulation circuit 216. The rectified current output by demodulation circuit 216 can then be filtered and converted to a digital code by ADC 217.

A series of such digital codes measured from adjacent sensor or intersections may be converted to touch coordinates indicating a position of an input on touch sensor array 121 by touch coordinate converter 218. The touch coordinates may then be used to detect gestures or perform other functions by the processing logic 102.

In one embodiment, the capacitance sensor 101 can be configured to detect multiple touches. One technique for the detection and location resolution of multiple touches uses a two-axis implementation: one axis to support rows and another axis to support columns. Additional axes, such as a diagonal axis, implemented on the surface using additional layers, can allow resolution of additional touches.

Figure 3A:
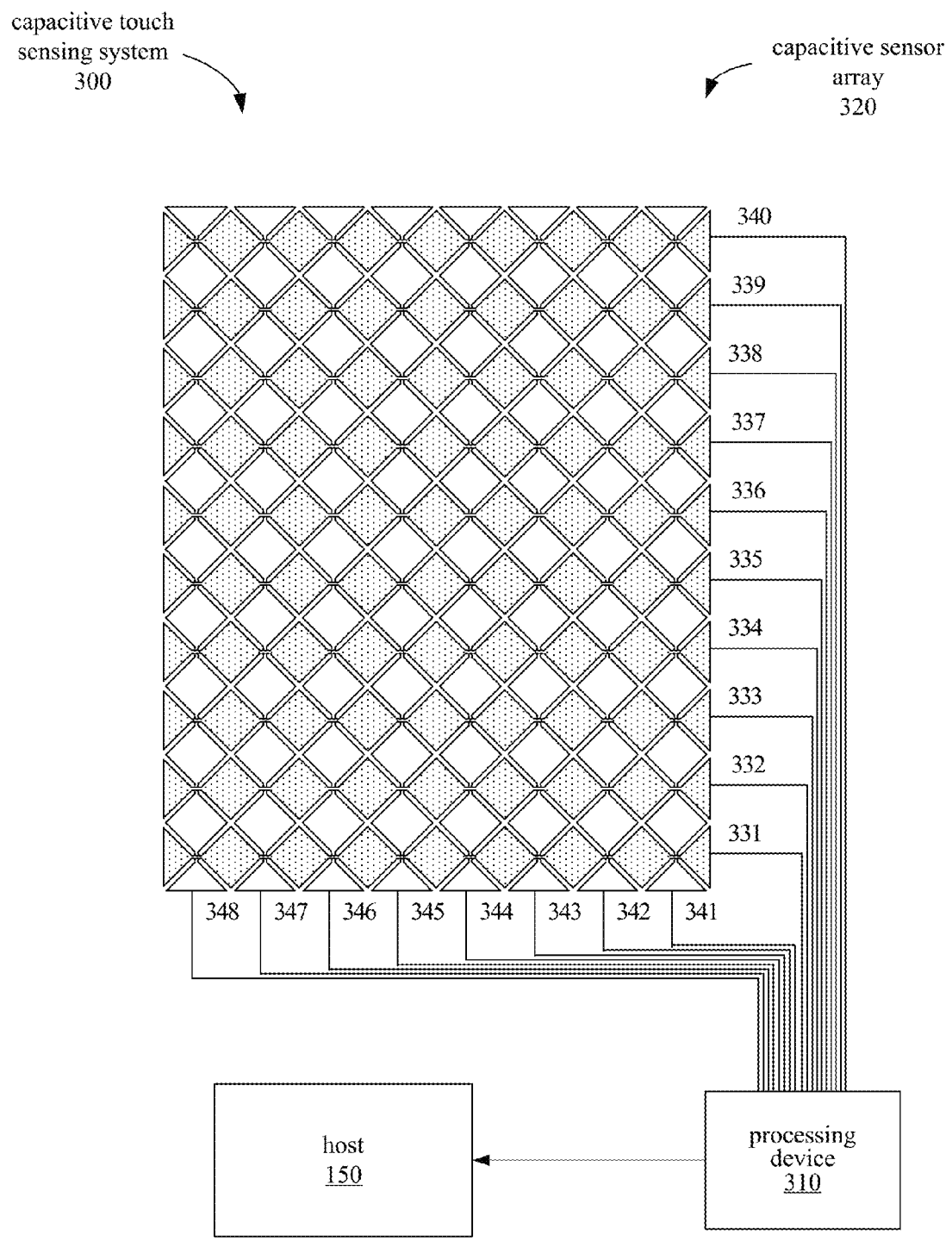
FIG. 3A illustrates an embodiment of an electronic touch-sensing system using a dual solid diamond capacitive sensor pattern.

FIG. 3A illustrates an embodiment of a capacitive touch sensing system 300 that includes a capacitive sensor array 320. Capacitive sensor array 320 includes a plurality of row sensor electrodes 331-340 and a plurality of column sensor electrodes 341-348. The row and column sensor electrodes 331-348 are connected to a processing device 310, which may include the functionality of capacitance sensor 101, as illustrated in FIG. 2. In one embodiment, the processing device 310 may perform TX-RX scans of the capacitive sensor array 320 to measure a mutual capacitance value associated with each of the intersections between a row sensor electrode and a column sensor electrode in the sensor array 320. The measured capacitances may be further processed to determine higher resolution locations of one or more contacts at the capacitive sensor array 320.

In one embodiment, the processing device 310 is connected to a host 150 which may receive the measured capacitances or calculate high precision locations from the processing device 310.

Figure 3B:
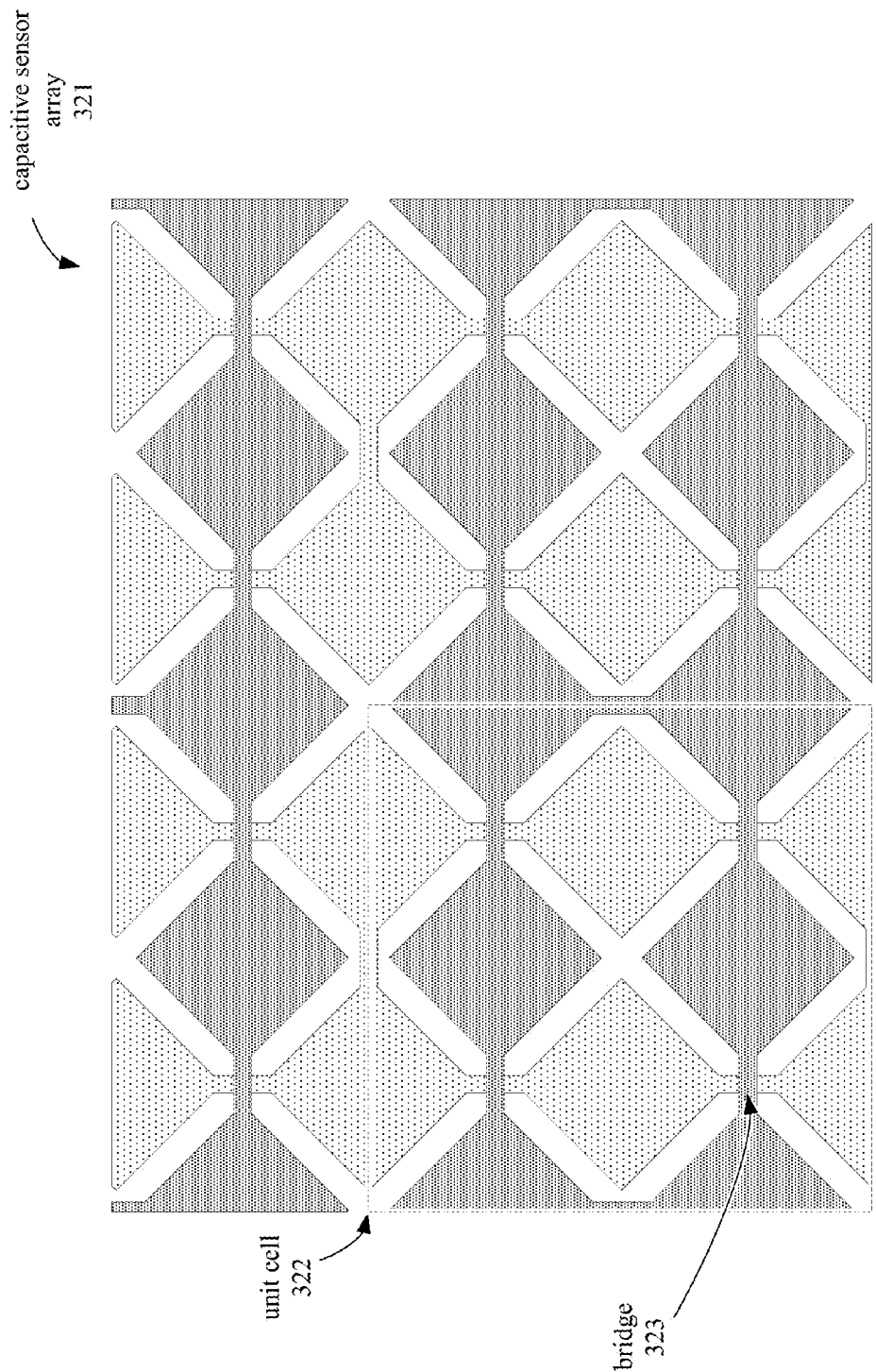
FIG. 3B illustrates an embodiment of a dual solid diamond capacitive sensor pattern.

The sensor array 320 illustrated in FIG. 3A includes sensor electrodes arranged in a diamond pattern. Specifically, the sensor electrodes 331-348 of sensor array 320 are arranged in a single solid diamond (SSD) pattern. FIG. 3B illustrates a capacitive sensor array 321 having an alternate embodiment of the diamond pattern, which is the dual solid diamond (DSD) pattern. Each of the sensor electrodes of capacitive sensor array 321 includes two rows or columns of electrically connected diamond shaped traces. Relative to the SSD pattern, the DSD pattern has improved signal disparity characteristics due to an increase in the coupling between TX and RX sensor electrodes while maintaining the same self-capacitance coupling possible between each sensor electrode and a conductive object near the sensor electrode. The DSD pattern may also provide higher sensitivity for tracking smaller objects, such as the point of a stylus, as compared to patterns having larger features, such as SSD. However, the DSD pattern also increases the number of bridges (such as bridge 323) used to create the pattern, which may result in decreased manufacturing yield. The increased number of bridges may also be visible if metal bridges are used. For example, sensor array 321 includes four bridges within unit cell 322.

Figure 4A:
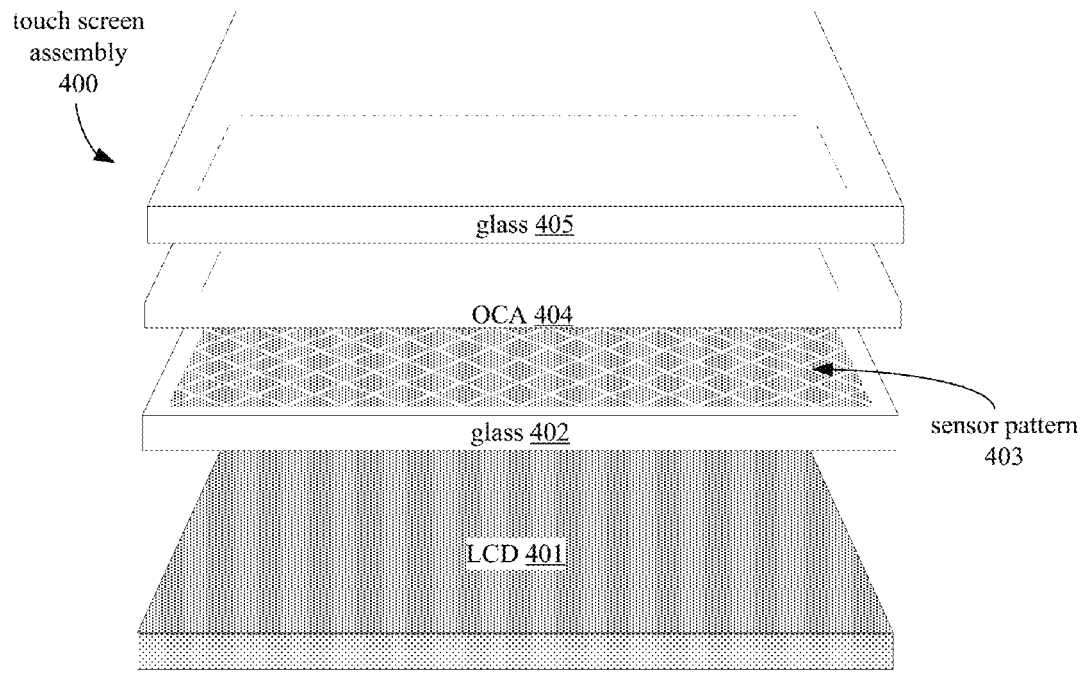
FIGS. 4A and 4B illustrate embodiments of touch screen assemblies.
Figure 4B:
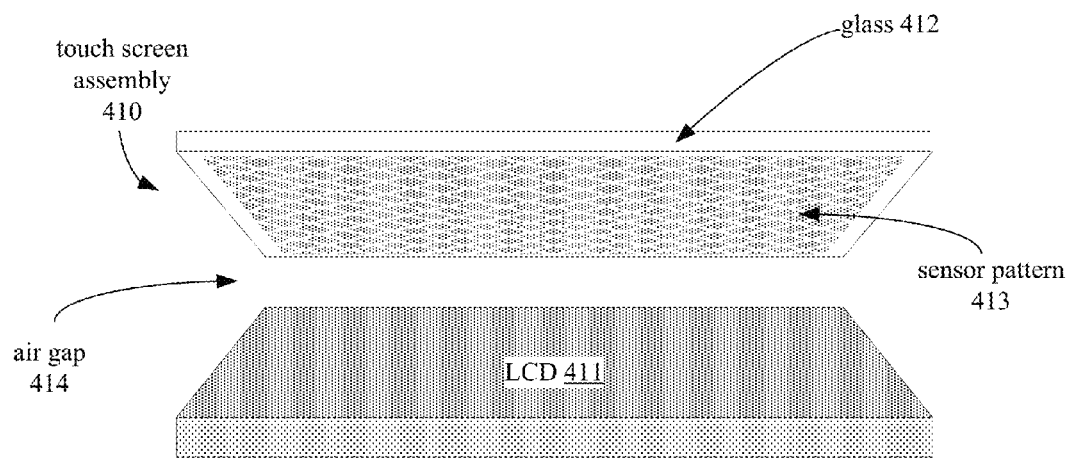

FIGS. 4A and 4B illustrate embodiments of touch screen assemblies 400 and 410, respectively, that include capacitive sensor arrays. Touch screen assembly 400 includes a liquid crystal display (LCD) 401 over which glass 402 is laid. A sensor pattern 403 is constructed on the surface of glass 402. In one embodiment, the sensor pattern 403 is constructed on the surface of glass 402 that faces away from the LCD 401. Optically clear adhesive (OCA) 404 may be used to bond glass 405 to the surface of glass 402 on which the sensor pattern 403 is constructed, thus protecting the sensor pattern 403. The sensor pattern 403 may be a SSD pattern, a DSD pattern, or another pattern as described in the following figures.

Touch screen assembly 410 includes an LCD 411, over which a glass 412 may be positioned. In one embodiment, sensor pattern 413 may be constructed on the surface of glass 412 that faces the LCD 411. In one embodiment, an air gap 414 may separate the glass 412 from the LCD 411.

In one embodiment, a capacitive sensor pattern such as the SSD pattern, DSD pattern, or other capacitive sensor pattern described herein may include row and column sensor electrodes that can be expressed as a matrix of the intersections between the row and column electrodes. Resolution of these sensor arrays may be represented as the product of the number of columns and the number of rows. For example, for a sensor array with N row electrodes and M column electrodes, the number of intersections would be N×M.

Figure 5:
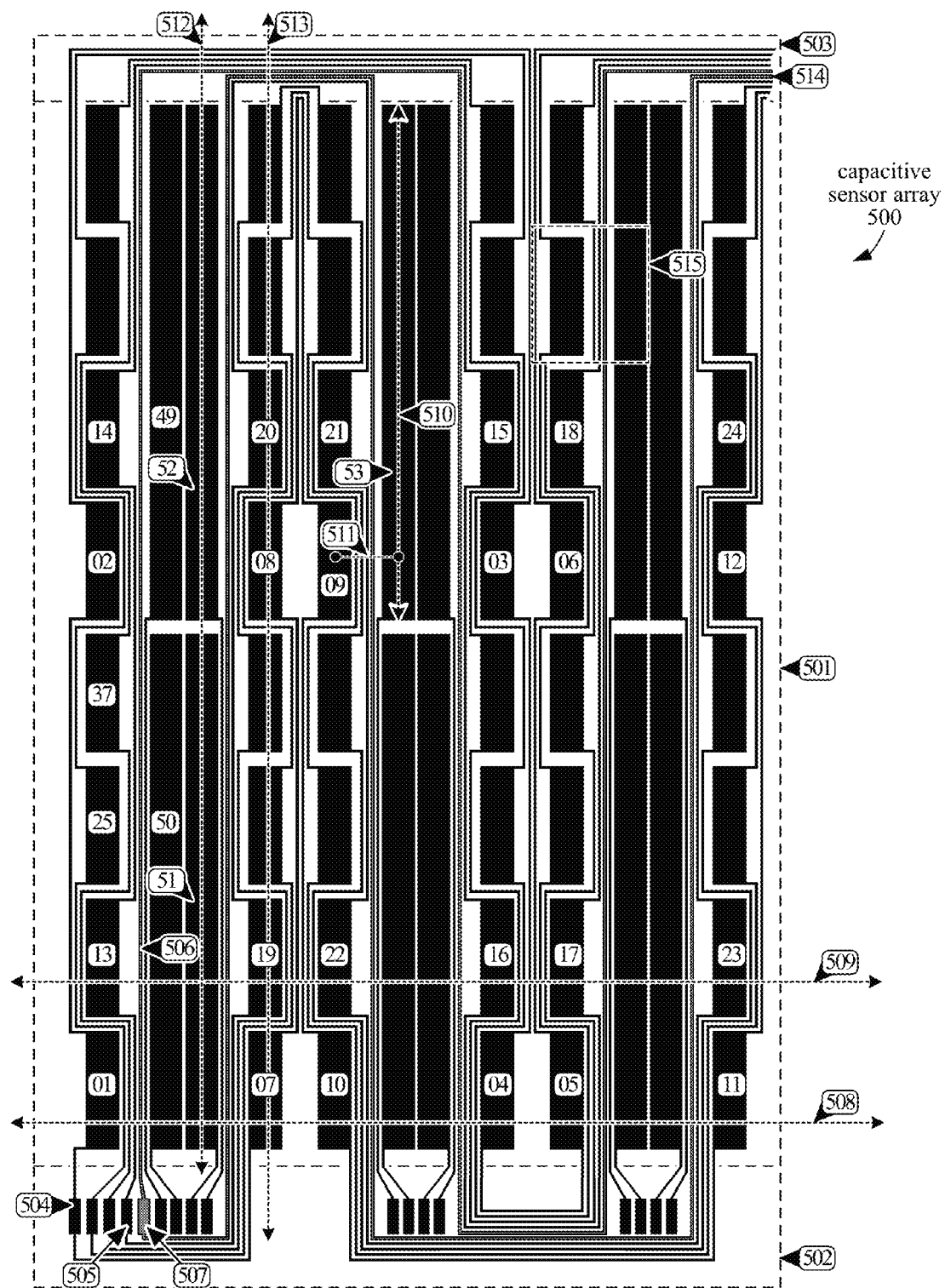
FIG. 5 illustrates an embodiment of a capacitive sensor array.

FIG. 5 illustrates an embodiment of a capacitive sensor array 500 constructed using a single layer of conductive material. In one embodiment, the sensor array 500 may be constructed in similar fashion as illustrated in FIGS. 4A and 4B. For example, the sensor array 500 may be constructed on the surface of glass 402 or glass 412 in place of sensor patterns 403 or 413, respectively.

The surface of the capacitive sensor array 500 can be divided into an active sensing region 501, an edge region 502, and a routing region 503. The active sensing region 501 designates the area of the sensor array 500 that can be used to detect the presence of one or more conductive objects (i.e., the area in which the presence of a conductive object can cause a detectable change in capacitance). The edge region 502 of the sensor array 500 includes portions of the sensor array pattern that are outside the active sensing region 501. The routing region 503 is an area that includes one or more conductive traces. As illustrated in FIG. 5, the edge region 502 borders the bottom of the active sensing region 501 and the routing region 503 borders the top edge of the active sensing region 501. In one embodiment, the routing region 503 may also be an edge region. In alternative embodiments, the illustrated sensor array pattern may be duplicated to form a larger touch-sensing panel so that the routing region 503 is located between two or more active sensing regions.

The capacitive sensor array 500 includes multiple large sensor electrodes and multiple small sensor electrodes that are formed from a single layer of conductive material (e.g., copper, ITO, etc.) and that are located within the active sensing region 501. Each of the small sensor electrodes has a smaller area than any of the large sensor electrodes in the sensor array 500.

The multiple small sensor electrodes are further divided into multiple sets of small sensor electrodes, where each electrode in a set is electrically connected to every other electrode in the same set by a set of connecting traces. For example, a first set of twelve small sensor electrodes includes electrodes 01-12, which are electrically connected to each other. A second set of twelve small sensor electrodes includes the electrically connected electrodes 13-24. Capacitive sensor array 500 as illustrated in FIG. 5 additionally includes two more sets of electrically connected small sensor electrodes: a set that includes electrode 25 and a set that includes electrode 37. Each of these sets includes twelve small sensor electrodes that are electrically connected by connecting traces.

The capacitive sensor array 500 also includes a set of bonding pads (e.g., bonding pads 504 and 505) that are located in the edge region 502. Each of the four sets of small sensor electrodes is connected to one of the bonding pads; for example, the set of electrodes 01-12 is connected to bonding pad 504 and the set of electrodes 13-24 is connected to bonding pad 505. In one embodiment, the bonding pads provide conductive areas at which wires can be physically bonded. In alternative embodiments, the capacitive sensor array 500 may include other types of conductive pads (e.g., contact pads) instead of bonding pads. In general, the pads provide a location at which electrical connections can be established with the sensor electrodes of the sensor array 500. The capacitive sensor array 500 also includes a ground trace 506 that is connected to a bonding pad 507 in the set of bonding pads located in the edge region 502. The length of the ground trace 506 runs through the active sensing region 501 between the large sensor electrodes and the small sensor electrodes in the sensor array 500.

In one embodiment, the small sensor electrodes in the sensor array 500 are arranged in rows and columns. For each set of electrically connected small sensor electrodes, a subset of the electrodes can be arranged in a row such that an axis can be drawn that crosses two or more of the small sensor electrodes in the subset. For example, the set of electrodes 01-12 includes a subset of sensor electrodes 01, 07, 10, 04, 05, and 11, which are arranged in a row such that an axis 508 crosses each of the electrodes 01, 07, 10, 04, 05, and 11 in the subset. Electrodes 02, 08, 09, 03, 06, and 12 in the same set of electrically connected electrodes are similarly arranged in a different row. As an additional example, the set of electrodes 13-24 includes a subset of sensor electrodes 13, 19, 22, 16, 17, and 23, which are arranged in a row such that an axis 509 crosses each of the electrodes 13, 19, 22, 16, 17, and 23. Electrodes 14, 20, 21, 15, 18, and 24 in the same set of electrically connected electrodes are similarly arranged in a different row.

In the capacitive sensor array 500, each small sensor electrode of the same electrically connected set is adjacent to a different large sensor electrode. Each large sensor electrode is adjacent to one small sensor electrode from each of the electrically connected sets of small sensor electrodes.

In one embodiment, the large sensor electrodes in sensor array 500 are arranged in columns such that an axis for each column crosses multiple large sensor electrodes. For example, axis 512 that is perpendicular to axes 508 and 509 crosses multiple large sensor electrodes 51 and 52 that are in the same column. In alternative embodiments, each column can include more than two large sensor electrodes. As illustrated in FIG. 5, each column of large sensor electrodes is adjacent to another column of large sensor electrodes.

In one embodiment, the small sensor electrodes are arranged in columns so that an axis for each column of small sensor electrodes crosses at least one electrode from each electrically connected set of small sensor electrodes. For example, an axis 513 for the column of small sensor electrodes including electrodes 07, 08, 19, 20, etc., is perpendicular to axes 508 and 509 and crosses two small sensor electrodes from each of the four electrically connected sets of small sensor electrodes. Thus, axis 513 crosses one small electrode from each electrically connected set for each large sensor electrode that is crossed by axis 512. Other columns of large and small sensor electrodes are similarly arranged.

For each small sensor electrode in the capacitive sensor array 500, the small sensor electrode is located on an opposite lateral side of one of the large sensor electrodes from another small sensor electrode that is in the same electrically connected set. For example, the small sensor electrodes 01 and 07 are located on opposite lateral sides of the large sensor electrode 51 (i.e., on opposite sides of a central longitudinal axis of the electrode 51) and large sensor electrode 50. Similarly, the small sensor electrodes 14 and 20 that are in the same electrically connected set of small sensor electrodes are located on opposite lateral sides of large sensor electrodes 49 and 52.

For each small sensor electrode in the capacitive sensor array 500, a shortest line segment that can be drawn between the geometric center of the small sensor electrode and a central longitudinal axis of the nearest large sensor electrode does not cross any other small sensor electrode. For example, line segment 511 between the geometric center of the small sensor electrode 09 and the central longitudinal axis 510 of the nearest large sensor electrode 53 does not cross any other small sensor electrode. Line segments similarly drawn between the geometric centers of the other small sensor electrodes and the central longitudinal axes of their respective nearest large sensor electrodes also do not cross any other small sensor electrodes. Such line segments do cross the ground trace 506, since the ground trace 506 is located between the small sensor electrodes and the large sensor electrodes in the sensor array 500.

While FIG. 5 illustrates six columns each of large sensor electrodes and small sensor electrodes, in alternative embodiments, the illustrated pattern can be extended by additional columns of similarly patterned large and small sensor electrodes connected to the ends 514 of the connecting traces.

In one embodiment, the capacitive sensor array 500 can be used in electronic system 100 in place of sensor array 121, or can be used in capacitive touch sensing system 300 in place of capacitive sensor array 320. The capacitance sensor 101 can then be used to measure mutual capacitances between the each of the large sensor electrodes and each of the electrically connected sets of small sensor electrodes in the capacitive sensor array 500. In one embodiment, the capacitance sensor 101 measures these mutual capacitances by applying a transmit (TX) signal to each of the large sensor electrodes and measuring a receive (RX) signal generated at each of the electrically connected sets of small sensor electrodes.

The illustrated arrangement of small sensor electrodes and large sensor electrodes in sensor array 500 results in a grid having 6 columns and 8 rows of unit cells. Each unit cell in the sensor array 500 includes one small sensor electrode and a portion of one adjacent large sensor electrode. In one embodiment, the fraction of the large sensor electrode that is included in the unit cell is equal to 1/k, where k is the number of electrically connected sets of small sensor electrodes. For example, unit cell 515 includes one small sensor electrode and ¼ of its adjacent large sensor electrode, since the capacitive sensor array includes 4 electrically connected sets of small sensor electrodes.

The connecting traces in the capacitive sensor array electrically connect the large and small sensor electrodes and the ground trace 506 to bonding pads located in the edge region 502. The capacitance sensor 101 thus connects to the electrodes in the sensor array 500 through the bonding pads. In one embodiment, capacitive sensor array 500 includes no more than one bonding pad for each large sensor electrode in the array 500, one bonding pad for each electrically connected set of small sensor electrodes, and one bonding pad for each ground trace.

In one embodiment, each of the bonding pads connected to small sensor electrodes may be connected to the small sensor electrodes via multiple connecting traces, with each of the multiple connecting traces connected to different small sensor electrodes in the same electrically connected set. For example, the bonding pad 504 is connected to small sensor electrode 01 via a connecting trace from the top end of bonding pad 504 and is also connected to a different small sensor electrode 07 via a connecting trace from the bottom end of the bonding pad 504.

From the bonding pad 504, the connecting traces connected to the top of bonding pad 504 connect the small sensor electrodes 01, 02, 03, 04, 05, and 06 in respective order, while the connecting traces connected to the bottom of bonding pad 504 connect the small sensor electrodes 07, 08, 09, 10, 11, and 12 in respective order. The two subsets of small sensor electrodes 01-06 and 07-12 and their corresponding connecting traces form two conductive paths each extending from edge region 502 to routing region 503, passing through routing region 503, extending back to edge region 502, and passing through edge region 502.

Figure 6:
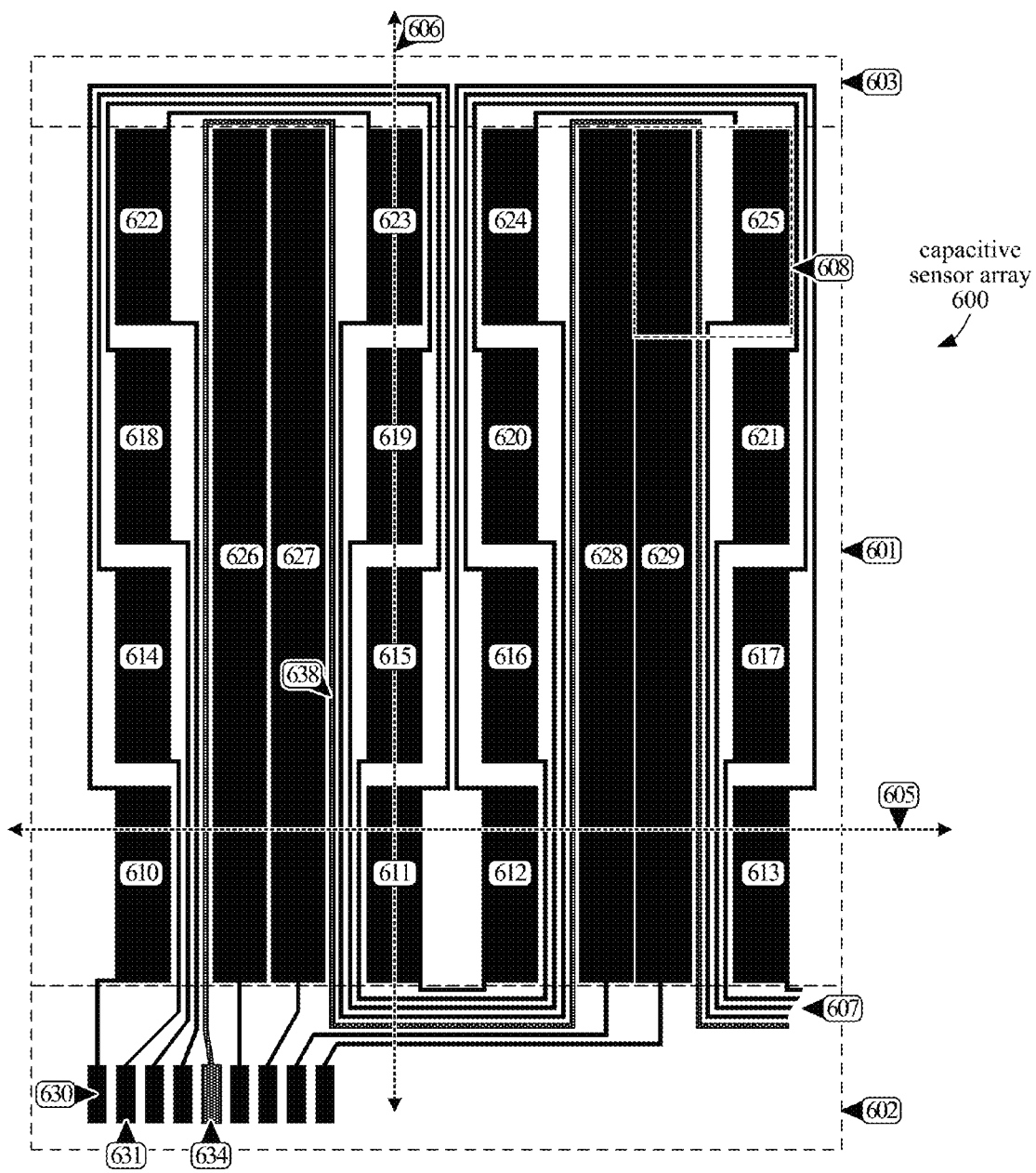
FIG. 6 illustrates an embodiment of a capacitive sensor array.

FIG. 6 illustrates an embodiment of a capacitive sensor array 600 constructed using a single layer of conductive material. In one embodiment, the sensor array 600 may be integrated into a touch screen assembly 400 or 410 in similar fashion as capacitive sensor array 600 and may be similarly sensed using a capacitance sensor 101 to measure mutual capacitances between small and large sensor electrodes.

The surface of the capacitive sensor array 600 can be divided into an active sensing region 601, an edge region 602, and a routing region 603. Included in the active sensing region 601 are multiple large sensor electrodes 626-629 and multiple small sensor electrodes 610-625 that are formed from a single layer of conductive material. Each of the small sensor electrodes has a smaller area than any of the large sensor electrodes in the sensor array 600. The multiple small sensor electrodes 610-625 are further divided into four sets of small sensor electrodes (610-613, 614-617, 618-621, and 622-625) that are electrically connected by connecting traces.

The capacitive sensor array 600 also includes a set of bonding pads (e.g., bonding pads 630, 631, etc.) that are located in the edge region 602. Each of the four sets of small sensor electrodes is connected to one of the bonding pads; for example, the set of electrodes 610-613 is connected to bonding pad 630 and the set of electrodes 614-617 is connected to bonding pad 631. The capacitive sensor array 600 also includes a ground trace 638 that is connected to a bonding pad 634 in the set of bonding pads located in the edge region 602. The length of the ground trace 638 runs through the active sensing region 601 between the large sensor electrodes and their adjacent small sensor electrodes.

In one embodiment, the small sensor electrodes in the sensor array 500 are arranged in rows and columns such that an axis for each row can be drawn that crosses two or more of the small sensor electrodes in an electrically connected set of small sensor electrodes. For example, the electrodes 610-613 are arranged in a row such that an axis 605 crosses each of the four electrodes 610-613 in the set. Small electrodes in other electrically connected sets are similarly arranged in rows, as illustrated in FIG. 6. In alternative embodiments where small electrodes in the same set are arranged in multiple rows, an axis for one of the rows may cross only a subset of the electrodes in the set.

In the capacitive sensor array 600, each small sensor electrode of the same electrically connected set is adjacent to a different large sensor electrode. Each large sensor electrode 626-629 is adjacent to one small sensor electrode from each of the electrically connected sets of small sensor electrodes. Each large sensor electrode 626-629 is adjacent to another large sensor electrode.

In one embodiment, the small sensor electrodes are arranged in columns so that an axis for each column of small sensor electrodes crosses at least one electrode from each electrically connected set of small sensor electrodes. For example, an axis 606 for the column of small sensor electrodes including electrodes 611, 615, 619, and 623 is perpendicular to axes 625 and crosses a small sensor electrode from each of the four electrically connected sets of small sensor electrodes.

For each small sensor electrode in the capacitive sensor array 600, the small sensor electrode is located on an opposite lateral side of at least one of the large sensor electrodes from another small sensor electrode that is in the same electrically connected set. For example, the small sensor electrodes 610 and 611 are located on opposite lateral sides of the large sensor electrodes 626 and 627. Similarly, the small sensor electrodes 616 and 617 that are in the same electrically connected set of small sensor electrodes are located on opposite lateral sides of large sensor electrodes 628 and 629.

While FIG. 6 illustrates four columns each of large sensor electrodes and small sensor electrodes, in alternative embodiments, the illustrated pattern can be extended by additional columns of similarly patterned large and small sensor electrodes connected to the ends 607 of the connecting traces.

The illustrated arrangement of small sensor electrodes and large sensor electrodes for sensor array 600 results in a grid having 4 columns and 4 rows of unit cells. Each unit cell in the sensor array 600 includes one small sensor electrode and a portion of one adjacent large sensor electrode. In one embodiment, the fraction of the large sensor electrode that is included in the unit cell is equal to $1/k$, where k is the number of electrically connected sets of small sensor electrodes. For example, unit cell 608 includes one small sensor electrode and ¼ of its adjacent large sensor electrode, since the capacitive sensor array 600 includes 4 electrically connected sets of small sensor electrodes.

The connecting traces in the capacitive sensor array 600 electrically connect the large and small sensor electrodes 610-629 and the ground trace 638 to bonding pads located in the edge region 602. The capacitance sensor 101 connects to the electrodes in the sensor array 600 through the bonding pads. In one embodiment, capacitive sensor array 600 includes no more than one bonding pad for each large sensor electrode in the array 600, one bonding pad for each electrically connected set of small sensor electrodes, and one bonding pad for each ground trace.

For each subset of electrically connected small sensor elements, a conductive path through the small sensor elements in the subset and their connecting traces extends from one of the bonding pads in the edge region 602 to the routing region 603 opposite the edge region 602 and back to the edge region 602. For example, the connecting traces from the bonding pad 630 connect the small sensor electrodes 610, 611, 612, and 613 in respective order. The set of small sensor electrodes 610-613 and its corresponding set of connecting traces form a conductive path that extends from edge region 602 to routing region 603, passes through routing region 603, extends back to edge region 602, and passes through edge region 602.

In contrast with sensor array 500, the bonding pads in the edge region 602 that are connected to small sensor electrodes are connected via a connecting trace at one end of the bonding pad, rather than at multiple ends. In one embodiment, since connecting traces are routed from only one end of each bonding pad, no connecting traces are routed between any of the bonding pads in the edge region 602. Thus, the bonding pads for the small and large sensor electrodes can be positioned closer together for a more compact connector.

Figure 7:
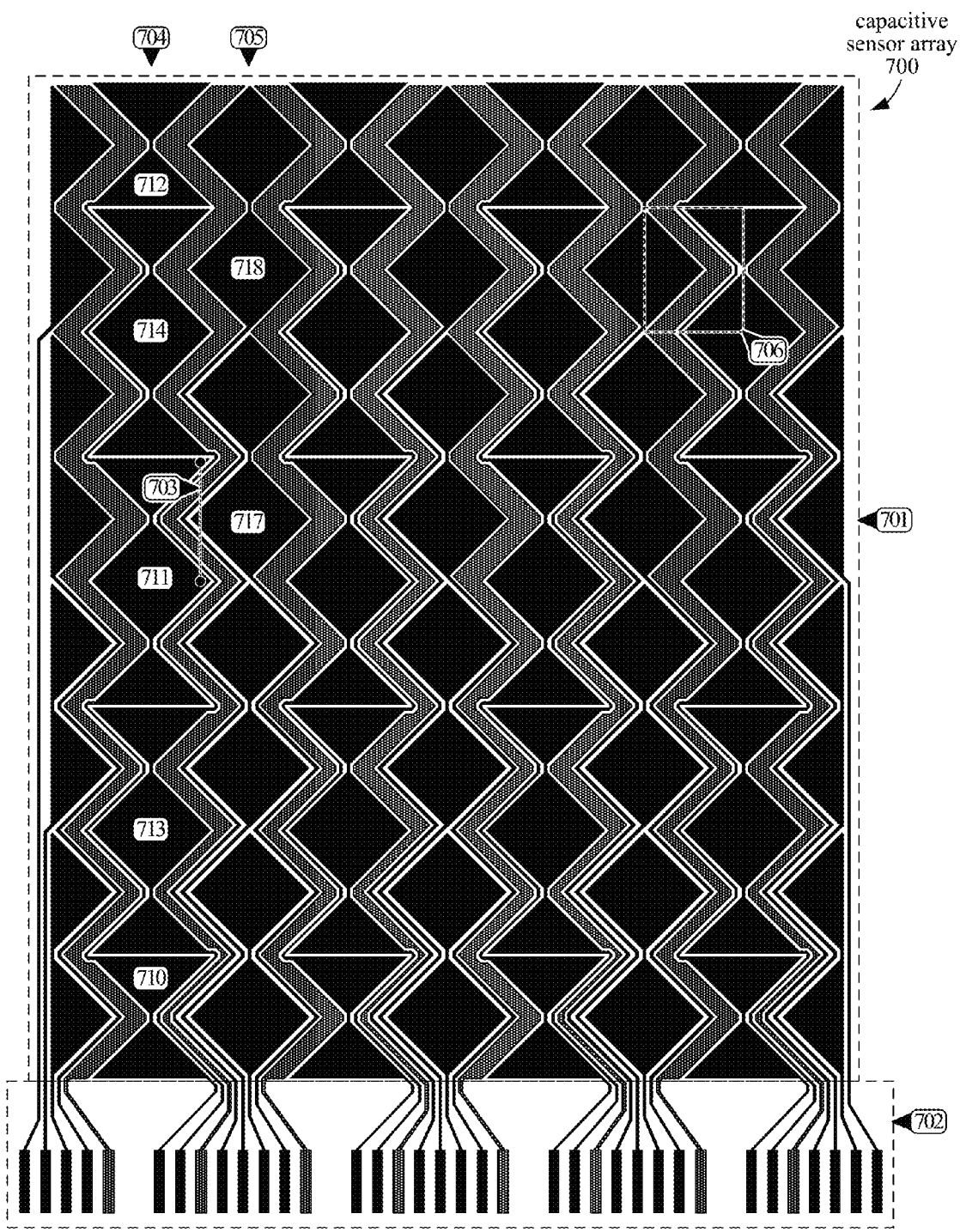
FIG. 7 illustrates an embodiment of a capacitive sensor array.

FIG. 7 illustrates an embodiment of a capacitive sensor array 700 constructed using a single layer of conductive material. In one embodiment, the sensor array 700 may be integrated into a touch screen assembly 400 or 410 in similar fashion as capacitive sensor array 500 or 600 and may be similarly sensed using a capacitance sensor 101 to measure mutual capacitances between TX and RX sensor electrodes.

The sensor array 700 includes multiple transmit (TX) and receive (RX) sensor electrodes in an active sensing region 701. In the capacitive sensor array 700, each of the TX and RX sensor electrodes are composed of multiple subelements, which are in the shape of diamonds or half-diamonds (i.e., triangles). In particular, each of the RX sensor electrodes (e.g., 711, 713, or 714) that is not at an edge of the sensor array 700 includes a diamond-shaped subelement and two half-diamond-shaped subelements, while RX sensor electrodes (e.g., 710 or 712) at an edge of the sensor array 700 include two half-diamond-shaped subelements. TX sensor electrodes away from an edge of the sensor array 700 are composed of two diamond-shaped subelements, while TX sensor electrodes at an edge of the sensor array 700 are composed of two half-diamond-shaped subelements.

The TX and RX electrodes in the array 700 are arranged so that the TX electrodes are offset in a vertical direction relative to the nearest adjacent RX electrodes. In particular, a line segment between the geometric centers of an RX electrode and an adjacent TX electrode is not perpendicular to a longitudinal axis of the column in which the RX or TX electrode is located. In one embodiment, the smaller angle between such a line segment and the longitudinal axis of the column is between 50 and 70 degrees.

In addition, the points of the diamond-shaped subelements of the offset TX and RX electrodes are interleaved. Accordingly, for each TX or RX sensor electrode, a line segment can be drawn between two points in the same electrode such that the line segment also crosses a portion of the adjacent electrode. For example, the line segment 703 can be drawn between two subelements of RX electrode 711 such that line segment 703 crosses a portion of the adjacent TX electrode 717.

In one embodiment, each TX sensor electrode is adjacent to four RX sensor electrodes; thus, each unit cell (e.g., unit cell 706) in the sensor array includes ¼ of the area of a TX sensor electrode and ¼ of the area of an adjacent RX sensor electrode, assuming the TX and RX electrodes are not located at an edge of the array 700.

In the sensor array 700, each column of RX sensor electrodes may include multiple sets of electrically connected RX electrodes. Column 704, for example, includes two sets of electrically connected RX electrodes: a set including electrodes 710-712, and a set including electrodes 713 and 714. Alternate electrodes are connected to each other via connecting traces, with the connecting traces for the two sets located on opposite lateral sides of the column 704. In one embodiment, the connecting traces follow the edges of the RX electrodes in the column to allow interleaving of the adjacent TX electrodes.

For each column of TX sensor electrodes, each TX sensor electrode in the column is electrically isolated from every other TX sensor electrode in the column. Each of the TX sensor electrodes are thus connected via separate connecting traces to separate bonding pads in the edge region 702. For each TX sensor electrode in the column, the connecting trace that connects the TX sensor electrode to its corresponding bonding pad extends from the TX sensor electrode along one lateral side of the column towards the edge region 702. In one embodiment, the connecting traces follow the edges of the TX electrodes in the column to allow interleaving of the adjacent RX electrodes.

TX electrodes in the same column that are sequential in order have connecting traces located on opposite lateral sides of the column of TX electrodes. For example, TX sensor electrodes 717 and 718 are sequential in the spatial order of TX electrodes in column 705; thus, the connecting trace for electrode 717 and the connecting trace for electrode 718 are routed along opposite sides of a central longitudinal axis of column 705.

The connecting traces in the capacitive sensor array 700 electrically connect the TX and RX sensor electrodes and the ground traces to the bonding pads located in the edge region 702. The capacitance sensor 101 connects to the electrodes in the sensor array 700 through the bonding pads. In one embodiment, capacitive sensor array 700 includes no more than one bonding pad for each TX sensor electrode in the array 700, one bonding pad for each electrically connected set of RX sensor electrodes, and one bonding pad for each ground trace.

In the foregoing embodiments, various modifications can be made; for example, row sensor electrodes and column sensor electrodes may be interchanged, and row or column sensor electrodes may be used as either TX or RX sensor electrodes. Furthermore, in some embodiments, intersections between row and column sensor electrodes may be replaced with conductive bridges. For example, bridges may be used to electrically connect portions of sensor electrodes when both row and column sensor electrodes are constructed from a single layer of conductive material. As described herein, conductive electrodes that are "electrically connected" or "electrically coupled" may be coupled such that a relatively low resistance conductive path exists between the conductive electrodes.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A capacitive sensor array, comprising:
   a plurality of large sensor electrodes located within an active sensing region;
   a plurality of small sensor electrodes including a first set of at least four small sensor electrodes and a second set of at least four small sensor electrodes located within the active sensing region, wherein the plurality of large sensor electrodes and the plurality of small sensor electrodes are formed from a single layer of conductive material; and
   a plurality of pads located within an edge region bordering the active sensing region,
   wherein each small sensor electrode of the first set of small sensor electrodes is electrically connected by a first conductive path through a first set of connecting traces to a first pad of the plurality of pads, wherein a first axis crosses two or more of the small sensor electrodes of the first set of small sensor electrodes, wherein each small sensor electrode of the first set of small sensor electrodes is located on an opposite lateral side of one of the plurality of large sensor electrodes from another small sensor electrode of the first set of small sensor electrodes,
   wherein each small sensor electrode of the second set of small sensor electrodes is electrically connected by a second conductive path through a second set of connecting traces to a second pad of the plurality of pads, wherein the first conductive path is non-overlapping with the second conductive path, wherein a second axis crosses two or more of the small sensor electrodes of the second set of small sensor electrodes, wherein each small sensor electrode of the second set of small sensor electrodes is located on an opposite lateral side of one of the plurality of large sensor electrodes from another small sensor electrode of the second set of small sensor electrodes, wherein a first segment of the first conductive path extends from the edge region to a routing region on a first lateral side of a second segment of the first conductive path, and extends back to the edge region on a second lateral side of the second segment opposite the first lateral side of the second segment prior to returning to the routing region, wherein the routing region borders the active sensing region on an opposite side of the active sensing region from the edge region.

2. The capacitive sensor array of claim 1, wherein for each small sensor electrode of the plurality of sensor electrodes, a shortest line segment between a geometric center of the small sensor electrode and a central longitudinal axis of a large sensor electrode nearest to the geometric center crosses a ground trace and does not cross any other small electrode.

3. The capacitive sensor array of claim 1, wherein the first pad is connected at opposite ends of the first pad to two connecting traces of the first set of connecting traces, and wherein the second pad is connected at opposite ends of the second pad to two connecting traces of the second set of connecting traces.

4. The capacitive sensor array of claim 1, wherein the plurality of pads comprises a pad for each large sensor electrode of the plurality of large sensor electrodes and for each of a plurality of sets of small sensor electrodes, wherein each small sensor electrode in the plurality of sets of small sensor electrodes is electrically connected to every other small sensor electrode in the same set of small sensor electrodes by a set of connecting traces, and wherein the plurality of sets of small sensor electrodes comprises the first set of sensor electrodes and the second set of sensor electrodes.

5. The capacitive sensor array of claim 4, further comprising one or more ground traces in the active sensing region, wherein a number of pads in the edge region is less than or equal to one pad for each large sensor electrode of the plurality of sensor electrodes, for each set of small sensor electrodes of the plurality of small sensor electrodes, and for each of the one or more ground traces.

6. The capacitive sensor array of claim 1, wherein a third axis perpendicular to the first axis and the second axis crosses at least one of the first set of small sensor electrodes and at least one of the second set of small sensor electrodes.

7. The capacitive sensor array of claim 6, wherein a fourth axis parallel to the third axis crosses two or more of the plurality of large sensor electrodes.

8. The capacitive sensor array of claim 7, further comprising one or more additional sets of small sensor electrodes, wherein each small sensor electrode in the one or more additional sets of small sensor electrodes is electrically coupled to every other small sensor electrode in the same set of small sensor electrodes by a set of connecting traces, wherein for each of the two or more large sensor electrodes crossed by the fourth axis, the third axis crosses one small sensor electrode from each of the additional sets of small sensor electrodes.

9. A capacitive sensor array, comprising:
a plurality of large sensor electrodes located within an active sensing region;
a plurality of small sensor electrodes including a first set of small sensor electrodes and a second set of small sensor electrodes located within the active sensing region, wherein the plurality of large sensor electrodes and the plurality of small sensor electrodes are formed from a single layer of conductive material; and
a plurality of pads located within an edge region bordering the active sensing region,
wherein a first segment of a first conductive path through each of the first set of small electrodes
extends, on a first lateral side of a second segment of the first conductive path, from a first pad of the plurality of pads to a routing region on an opposite side of the active sensing region from the edge region, and
extends, on a second lateral side of the second segment opposite the first lateral side of the second segment, from the routing region back to the edge region prior to returning to the routing region,
wherein a first axis crosses two or more of the small sensor electrodes of the first set of small sensor electrodes, wherein each small sensor electrode of the first set of small sensor electrodes is located on an opposite lateral side of one of the plurality of large sensor electrodes from another small sensor electrode of the first set of small sensor electrodes,
wherein a second conductive path through each of the second set of small electrodes is non-overlapping with the first conductive path and extends from a second pad of the plurality of pads to a routing region opposite the edge region, and extends from the routing region back to the edge region prior to returning to the routing region, wherein a second axis crosses two or more of the small sensor electrodes of the second set of small sensor electrodes, wherein each small sensor electrode of the second set of small sensor electrodes is located on an opposite lateral side of one of the plurality of large sensor electrodes from another small sensor electrode of the second set of small sensor electrodes.

10. The capacitive sensor array of claim 9, wherein for each small sensor electrode of the plurality of sensor electrodes, a shortest line segment between a geometric center of the small sensor electrode and a central longitudinal axis of a large sensor electrode nearest to the geometric center crosses a ground trace and does not cross any other small electrode.

11. The capacitive sensor array of claim 9, wherein the first pad is connected at opposite ends of the first pad to two connecting traces of the first set of connecting traces, and wherein the second pad is connected at opposite ends of the second pad to two connecting traces of the second set of connecting traces.

12. The capacitive sensor array of claim 9, wherein the plurality of pads comprises a pad for each large sensor electrode of the plurality of large sensor electrodes and for each of a plurality of sets of small sensor electrodes, wherein each small sensor electrode in the plurality of sets of small sensor electrodes is electrically connected to every other small sensor electrode in the same set of small sensor electrodes by a set of connecting traces, and wherein the plurality of sets of small sensor electrodes comprises the first set of sensor electrodes and the second set of sensor electrodes.

13. The capacitive sensor array of claim 9, further comprising a plurality of sets of small sensor electrodes, wherein the plurality of sets of small sensor electrodes comprises the first set of small sensor electrodes and the second set of small sensor electrodes, wherein each small sensor electrode in the plurality of sets of small sensor electrodes is electrically coupled to every other small sensor electrode in the same set of small sensor electrodes by a set of connecting traces, wherein a third axis perpendicular to the first axis and the second axis crosses two or more of the plurality of large sensor electrodes, wherein for each of the two or more large sensor electrodes crossed by the third axis, a fourth axis parallel to the third axis crosses one small sensor electrode from each of the plurality of sets of small sensor electrodes.

14. A method, comprising:
providing a plurality of large sensor electrodes located within an active sensing region;
providing a plurality of small sensor electrodes including a first set of at least four small sensor electrodes and a second set of at least four small sensor electrodes located within the active sensing region, wherein the plurality of large sensor electrodes and the plurality of small sensor electrodes are formed from a single layer of conductive material; and
providing a plurality of pads coupled with the capacitance sensor and located within an edge region bordering the active sensing region;
wherein each small sensor electrode of the first set of small sensor electrodes is electrically connected by a first conductive path through a first set of connecting traces to a first pad of the plurality of pads, wherein a first axis crosses two or more of the small sensor electrodes of the first set of small sensor electrodes, wherein each small sensor electrode of the first set of small sensor electrodes is located on an opposite lateral side of one of the plurality of large sensor electrodes from another small sensor electrode of the first set of small sensor electrodes,
wherein each small sensor electrode of the second set of small sensor electrodes is electrically connected by a second conductive path through a second set of connecting traces to a second pad of the plurality of pads, wherein the first set of conductive paths is non-overlapping with the second set of conductive paths, wherein a second axis crosses two or more of the small sensor electrodes of the second set of small sensor electrodes, wherein each small sensor electrode of the second set of small sensor electrodes is located on an opposite lateral side of one of the plurality of large sensor electrodes from another small sensor electrode of the second set of small sensor electrodes, wherein a first segment of the first conductive path extends from the edge region to a routing region on a first lateral side of a second segment of the first conductive path, and extends back to the edge region on a second lateral side of the second segment opposite the first lateral side of the second segment prior to returning to the routing region, wherein the routing region borders the active sensing region on an opposite side of the active sensing region from the edge region.

15. The method of claim 14, further comprising providing one or more ground traces in the active sensing region, wherein a number of the plurality of pads in the edge region is less than or equal to one pad for each large sensor electrode of the plurality of sensor electrodes, for each set of electrically connected small sensor electrodes of the plurality of small sensor electrodes, and for each of the one or more ground traces.

16. The method of claim 14, wherein the plurality of pads comprises a pad for each large sensor electrode of the plurality of large sensor electrodes and for each of a plurality of sets of small sensor electrodes, wherein each small sensor electrode in the plurality of sets of small sensor electrodes is electrically coupled to every other small sensor electrode in the same set of small sensor electrodes by a set of connecting traces, wherein the plurality of sets of small sensor electrodes comprises the first set of sensor electrodes and the second set of sensor electrodes.

17. The capacitive sensor array of claim 14, wherein for each small sensor electrode of the plurality of sensor electrodes, a shortest line segment between a geometric center of the small sensor electrode and a central longitudinal axis of a large sensor electrode nearest to the geometric center crosses a ground trace and does not cross any other small electrode, and wherein the first pad is connected at opposite ends of the first pad to two connecting traces of the first set of connecting traces, and wherein the second pad is connected at opposite ends of the second pad to two connecting traces of the second set of connecting traces.

18. The capacitive sensor array of claim 14, wherein a third axis perpendicular to the first axis and the second axis crosses at least one of the first set of small sensor electrodes and at least one of the second set of small sensor electrodes, and wherein a fourth axis parallel to the third axis crosses two or more of the plurality of large sensor electrodes.

* * * * *